Patented July 20, 1926.

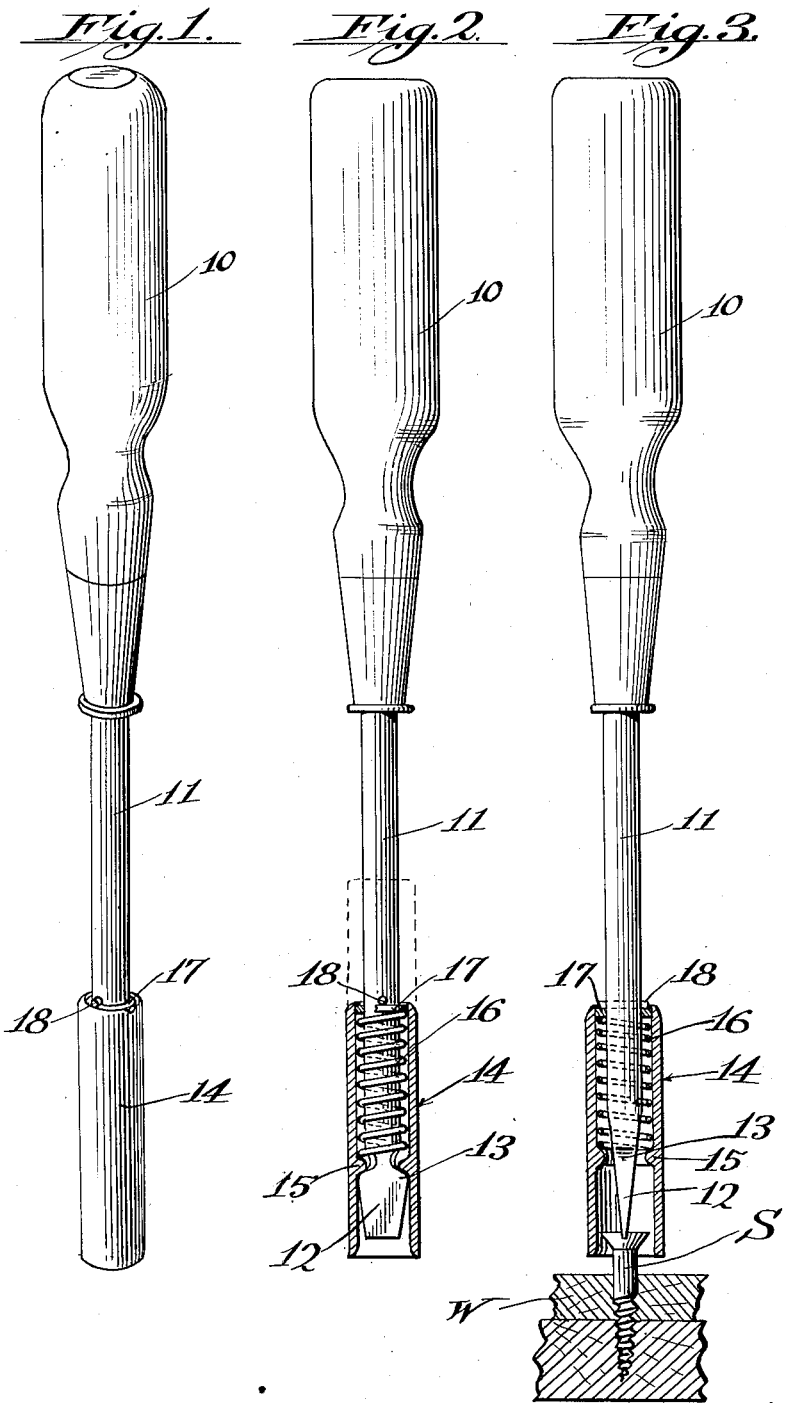

1,593,233

UNITED STATES PATENT OFFICE.

SAMUEL P. WILSON, OF LOS ANGELES, CALIFORNIA.

SCREW DRIVER.

Application filed September 8, 1925. Serial No. 54,966.

This invention relates to improvements in screw drivers.

An object of the invention is to provide an improved screw driver which is so constructed that it is impossible for the blade of the screw driver to slide out of the end of the groove formed on the head of a screw which is to be driven.

The improved screw driver consists essentially of a screw driver having a sleeve slidable and rotatable thereon which sleeve in normal position has its end projecting beyond the blade of the screw driver so as to receive the head of the screw to be driven so that when the blade is placed in the groove on the screw head it cannot move laterally out of either end of the groove.

With the foregoing and other objects in view which will be made manifest from the following detailed description and specifically pointed out in the appended claims, reference is had to the accompanying drawings, wherein:

Figure 1 is a perspective view of the improved screw driver.

Fig. 2 is a side elevation of the screw driver, the sleeve being broken away and shown in section.

Fig. 3 is a side elevation of the screw driver taken at right angles to Fig. 2, the sleeve being broken away and shown in section and the screw driver shown in applied position.

Referring to the accompanying drawings, wherein similar reference characters designate similar parts throughout, the improved screw driver consists of a handle 10 and a shank 11 which has its lower end flattened and tapered to provide a blade 12. Adjacent the blade 12 and slightly thereabove there are formed shoulders 13. About the lower end of the shank 11 and about the blade 12 there is arranged a sleeve 14 which has an internal shoulder 15 formed thereon, adapted to engage the shoulders 13 to limit the downward movement of the sleeve upon the shank. A coil spring 16 is disposed about the shank 11 within the sleeve 14 and has its lower end resting upon the internal shoulder 15. The upper end of the coil spring 16 rests against a washer 17 which has its upward movement on the shank limited by means of a pin 18 driven through the shank 11.

In operation the coil spring 16 urges the sleeve 14 downwardly upon the shank to assume the positions shown in Figs. 2 and 3, wherein the shoulder 15 engages upon the shoulders 13. In such position the lower end of the sleeve extends beyond the end of the blade 12 and is capable of receiving the head of the screw S.

By this construction it will be readily appreciated that when the blade 12 is placed in the groove on the head of the screw it is impossible for the blade to slide laterally out of the ends of the groove. When the screw is driven home the bottom edge of the sleeve 14 engages the work W and may either be held frictionally in place or may rotate with the shank. The bottom of the sleeve has its edges preferably rounded so that it will not scratch the work or otherwise mar it. When the top of the screw head is approximately flush with the surface of the work the sleeve can slide up upon the shank of the screw driver against the action of the coil spring 16.

When the screw is to be counter-sunk or is to be driven into the position which is below the surface of the work W, the coil spring 16 will permit the sleeve to slide up a sufficient distance upon the shank so that the blade of the screw driver projects beyond the bottom edge of the sleeve. Also the sleeve can be caused to assume such a position upon the shank when the blade of the screw driver is initially placed in the groove on the screw head.

From the above described construction it will be readily appreciated that an improved screw driver is provided which will facilitate the driving of screws over the conventional screw driver constructions.

Various changes may be made in the details of construction without departing from the spirit or scope of the invention as defined by the appended claims.

I claim:

1. A screw driver having a shoulder formed on its shank adjacent its blade, a sleeve disposed about the blade having an internal shoulder thereon adapted to engage the shoulder on the shank, a coil spring disposed within said sleeve about the shank of the screw driver and having one end resting upon said internal shoulder, a pin extending through the shank and a washer disposed against said pin against which the other end of the said spring bears, said spring serving to urge the sleeve downwardly upon the shank so that its end projects beyond the blade so as to receive the head of a screw to be driven, but permitting it to slide upwardly upon the shank.

2. A screw driver having a shoulder formed upon its shank adjacent its blade, a sleeve disposed about the blade having an internal shoulder thereon adapted to engage upon the shoulder on the shank, a coil spring disposed within said sleeve about the shank of the screw driver and having one end resting upon said internal shoulder, and means providing an abutment upon the shank of the screw driver which is slidable within the sleeve and against the under side of which the other end of said spring rests, said spring serving to urge the sleeve downwardly upon the shank so that its end projects beyond the blade so as to receive the head of a screw to be driven, but permitting it to slide upwardly upon the shank.

In testimony whereof I have signed my name to this specification.

SAMUEL P. WILSON.